United States Patent [19]

Yoshimura

[11] Patent Number: 4,787,059
[45] Date of Patent: Nov. 22, 1988

[54] SYSTEM FOR EFFECTIVE SPELL CHECK IN WORD PROCESSING WITH RELOCATED STARTING LOCATION

[75] Inventor: Motokazu Yoshimura, Nagoya, Japan

[73] Assignee: Brother Kogyo Kabushiki Kaisha, Japan

[21] Appl. No.: 840,657

[22] Filed: Mar. 18, 1986

[30] Foreign Application Priority Data

Mar. 23, 1985 [JP] Japan .................................. 60-58777

[51] Int. Cl.[4] ...................... G06F 15/02; G06F 15/40
[52] U.S. Cl. ..................................... 364/900; 364/419
[58] Field of Search ............... 364/419, 200 MS File, 364/900 MS File; 434/156, 167, 169; 400/63, 83, 95, 100

[56] References Cited

U.S. PATENT DOCUMENTS

| | | | |
|---|---|---|---|
| 3,780,846 | 12/1973 | Kolpek et al. | 400/63 |
| 4,041,467 | 8/1977 | Cota et al. | 364/900 |
| 4,136,395 | 1/1979 | Kolpek et al. | 364/518 |
| 4,158,236 | 6/1979 | Levy | 364/900 |
| 4,198,906 | 4/1980 | Fujikawa et al. | 364/900 |
| 4,218,760 | 8/1980 | Levy | 364/900 |
| 4,270,182 | 5/1981 | Asija | 364/900 |
| 4,323,315 | 4/1982 | Demonte | 400/63 |
| 4,328,561 | 5/1982 | Convis et al. | 364/900 |
| 4,339,806 | 7/1982 | Yoshida | 364/900 |
| 4,355,371 | 10/1982 | Convis et al. | 364/900 |
| 4,383,307 | 5/1983 | Gibson, III | 364/900 |
| 4,384,329 | 5/1983 | Rosenbaum et al. | 364/300 |
| 4,408,302 | 10/1983 | Fessel et al. | 364/900 |
| 4,413,318 | 11/1983 | Herrington | 364/200 |
| 4,420,817 | 12/1983 | Yoshida | 364/900 |
| 4,438,505 | 3/1984 | Yanagiuchi et al. | 364/900 |
| 4,439,836 | 3/1984 | Yoshida | 364/900 |
| 4,456,969 | 6/1984 | Herzik et al. | 364/900 |
| 4,467,446 | 8/1984 | Sakurai | 364/900 |
| 4,481,607 | 11/1984 | Kobayashi et al. | 364/900 |
| 4,498,148 | 2/1985 | Glickman | 364/900 |
| 4,499,553 | 2/1985 | Dickinson et al. | 364/900 |
| 4,499,554 | 2/1985 | Kobayashi | 364/900 |
| 4,502,128 | 2/1985 | Okajima et al. | 364/900 |
| 4,503,426 | 3/1985 | Mikulski | 364/900 X |
| 4,503,514 | 3/1985 | Urquhart | 364/900 |
| 4,542,477 | 9/1985 | Noyori et al. | 364/900 |
| 4,546,973 | 6/1984 | Carlgren et al. | 364/900 |

(List continued on next page.)

OTHER PUBLICATIONS

"Eight Bit Character Encoding for Multiple Languages", V. A. Mayfield; *IBM Technical Disclosure Bulletin;* vol. 26, No. 2, p. 537, Jul. 1983.

"Spelling Processing . . . Interface", Adam et al., *IBM Technical Disclosure Bulletin,* vol. 24, No. 10, pp. 5003–5008, Mar. 1982.

"Method for Detecting and Correcting . . . ", Barkir et al., *IBM Technical Disclosure Bulletin,* vol. 25, No. 8, p. 4225, Jan. 1983.

"Spelling Checking Typewriter", Hackett, *IBM Technical Disclosure Bulletin,* vol. 18, No. 2, pp. 530–531, Jul. 1975.

"Video Disc Dictionary System", Cohen et al., *IBM Technical Disclosure Bulletin,* vol. 25, No. 8, p. 4209, Jan. 1983.

*Primary Examiner*—Gary V. Harkcom
*Assistant Examiner*—Lawrence E. Anderson
*Attorney, Agent, or Firm*—Parkhurst, Oliff & Berridge

[57] ABSTRACT

An apparatus for checking a spelling of an input English word and for storing a new English word is provided, including an input device for receiving a word, an electronic dictionary memory consisting essentially of a first dictionary in which pre-installed English words are stored and a second dictionary for storing new English words and a search device for searching an input word through the first and the second dictionary. A store is also provided for storing a new input word that has not been found in either the first or the second dictionary into the second dictionary which includes an address memory in which an address of the second dictionary for starting the word searching is stored. A writing device is provided for writing the new input word at just before the address stored in the address memory, and a change is provided for changing the address in the address memory to the head address of the written word.

8 Claims, 8 Drawing Sheets

U.S. PATENT DOCUMENTS

| | | | |
|---|---|---|---|
| 4,548,520 | 10/1985 | Ueno | 364/518 |
| 4,559,598 | 12/1985 | Goldwasser et al. | 364/419 |
| 4,564,301 | 1/1986 | Ueno | 400/63 |
| 4,567,573 | 1/1986 | Hashimoto et al. | 364/900 |
| 4,580,241 | 4/1986 | Kucera | 364/900 |
| 4,584,667 | 4/1986 | Hashimoto et al. | 364/900 |
| 4,590,560 | 5/1986 | Sado | 364/419 |
| 4,594,686 | 6/1986 | Yoshida | 364/900 |
| 4,611,995 | 9/1986 | Sado | 364/419 |
| 4,688,192 | 5/1987 | Lavin | 433/205 |

4,787,059

SYSTEM FOR EFFECTIVE SPELL CHECK IN WORD PROCESSING WITH RELOCATED STARTING LOCATION

BACKGROUND OF THE INVENTION

1. Technical Field

This invention relates to an electronic dictionary system applied in an English Word Processor and, more particular, to the adjustment of word data stored in a dictionary memory in the electronic dictionary which can register a required word by an operator.

2. Prior Art

A conventional electronic dictionary applies a first dictionary memory which is made of a read only memory (ROM) stored with a plurality of pre-installed English word data and a second dictionary memory which is made of a random access memory (RAM) for storing the word data registered by an operator. On inputting a word by a keyboard, a Central Processing Unit (CPU) judges whether or not the word data is previously stored in the first and the second dictionary memories. If the word data is not stored in either dictionary, the word is flickered on CRT to inform the operator that the word may to be misspelled. The CPU then executes the word searching successively in the second dictionary with a priority order. The search starting point is set to the latest registered word by an operator or a coincident word data with a latest input word in the second dictionary memory.

The aforementioned conventional dictionary requires shift and rearrangement of whole previously-registered English word data of the second dictionary memory in order to store the word newly input by an operator or in order to give the highest priority order for searching to the word data coincident with an input word, which has caused such problems as taking much time.

SUMMARY OF THE INVENTION

An object of the invention is to save the processing time for registering an input word from which the word searching is primarily executed instead of moving all the stored word data.

Another object of the invention is to save the processing time for shifting an input word from which the word searching is primarily executed instead of moving the entire stored word data block.

The first embodiment comprises an apparatus for checking a spelling of an input English word and for storing a new English word comprising an input device for receiving a word, an electronic dictionary memory consisting essentially of a first dictionary in which pre-installed English words are stored and a second dictionary for storing new English words, a search means for searching an input word through the first and the second dictionary, and a store means for storing a new input word that has been found in neither the first nor the second dictionary into the second dictionary including an address memory in which an address of the second dictionary for starting the word searching is stored, a writing means for writing the new input word before the address is stored in the address memory, and a change means for changing the address in the address memory to the head address of the written word.

The second embodiment applies to an input apparatus for checking a spelling of an input English word comprising an input device for receiving a word, an electronic dictionary memory consisting essentially of a first dictionary in which pre-installed English words are stored and a second dictionary for storing new English words, a search means for searching an input word through the first and the second dictionary, and a rearrangement means for rearranging the second dictionary if an input word is found in the second dictionary, including an address memory in which an address of the second dictionary for starting the word searching is stored, a move means for moving the found input word to just before the address stored in the address memory, and a change means for changing the address in the address memory to the head address of the moved word. In the first embodiment, a newly registered English word is stored in ahead of the starting point of searching in the second dictionary memory to be primarily searched at the next time. In the second embodiment, the coincident word with an input word is moved and stored ahead of the starting point of searching in the second dictionary memory to be primarily searched at the next time.

DETAILED DESCRIPTION OF PREFERRED EMBODIMENTS

Figure 1:
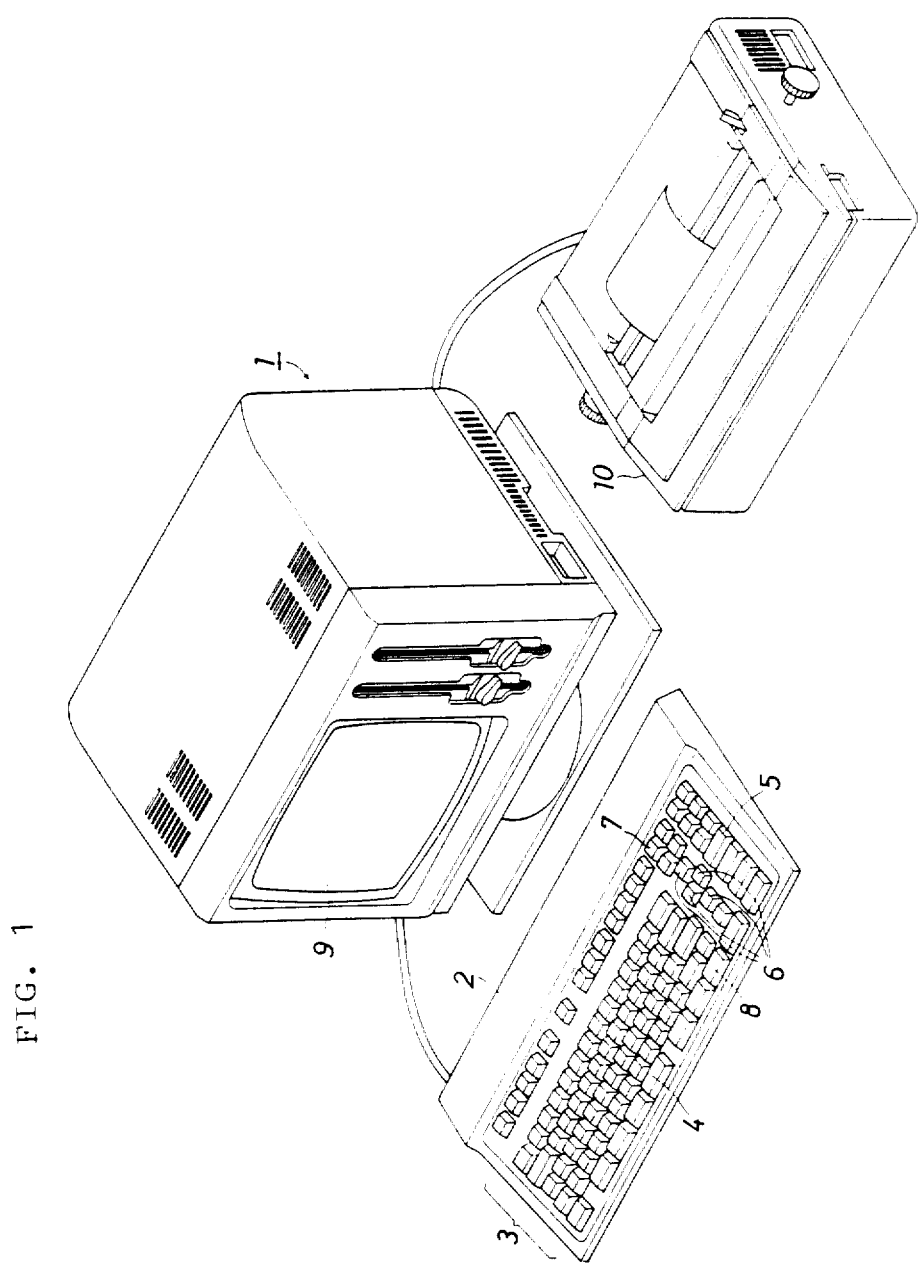
FIG. 1 is a perspective view of an English Word Processing system relating to the present invention.

Detailed description is explained in reference to figures illustrating an English word processor applied with electronic dictionaries. An English Word Processor 1 employs character keys 3 and a space key 4 as an input device on an input board 2. Depressing the character key 3 selectively inputs the various corresponding character data such as letters and numerals.

A correction key 5 and a cursor key 6 are attached to the right side of the character keys 3 to correct a misspelled word by the character keys 3. A registration key 7 is attached above the cursor key 6 in use for registrating a new word of the second dictionary memory as mentioned below. A select key 8 is attached below the cursor key 6 for replacing the misspelled word with the one input by the correction key 5 and the character keys 3, or storing the input word by the registration key 7 and the character keys 3 of the second dictionary memory.

A CRT 9 as a display means is employed behind the input board 2 to display English words or numerals which are input by the character keys 3.

Figure 2:
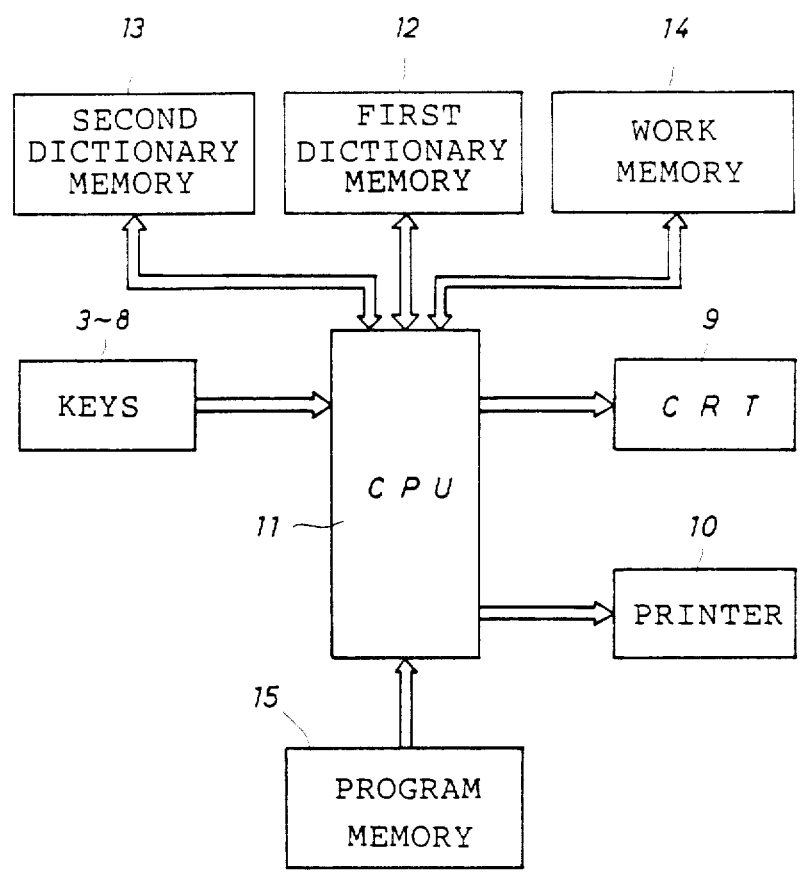
FIG. 2 is a block diagram showing the electrical constitution of the present invention.

The electronic constitution of the word processor 1 is explained in reference to FIG. 2.

The word data input by the respective key operation is output to a Central Processing Unit (hereinafter referred to as CPU) 11 having various functions of display, searching and registering of the word data. The CPU 11 displays the word on the CRT 9 in accord with these signals.

A program memory is made of Read Only Memory (ROM) in which the program data is stored for executing word processing.

A first dictionary memory 12 connected to the CPU 11 is made of ROM in which plural word data are stored. A second dictionary memory 13 connected to the CPU 11 is made of Random Access Memory (RAM) in which the latest registered word by depression of the registration key 7 is stored so that it is primarily searched by the CPU 11. Moreover, when the CPU 11 detects a coincident word data with an input word by the operator to exist in the second dictionary memory, the word data is moved to the location of the primary order of the searching by the CPU 11.

Figure 3:
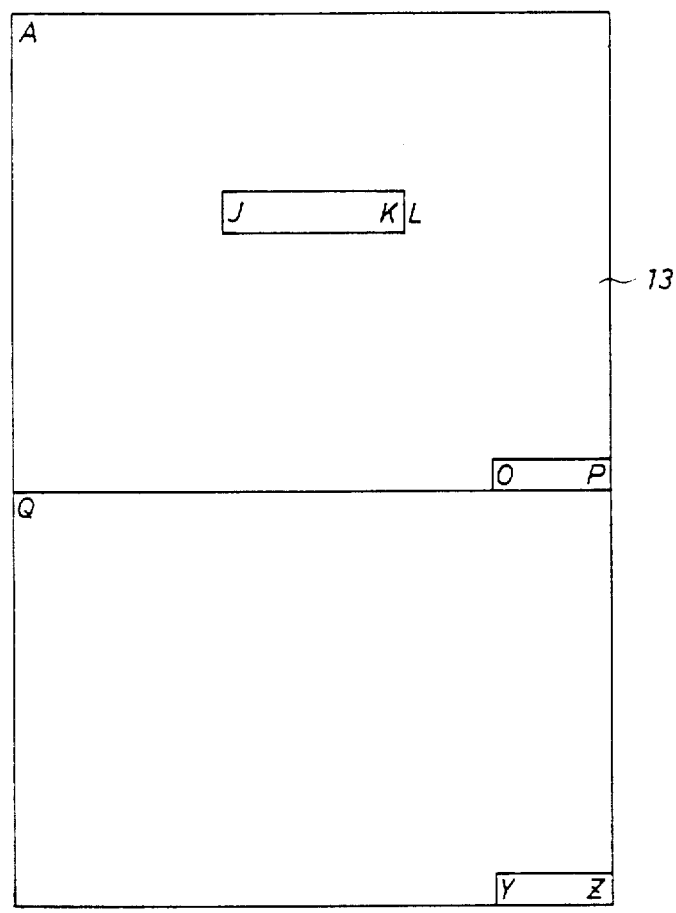
FIG. 3 is a descriptive view of the inside of the second dictionary memory in the first embodiment of the present invention.

Refering now to an example of the constitution on the basis of FIG. 3, the second dictionary memory 13 has a memory region from an address A to an address Z. In case of an unoccupied state, the region is blank. As shown in the figure, much word data is stored from the address A to the address P and the region from the address Q to the address Z is still blank. A word searching is executed in the direction from the address A to the address Z by the CPU 11 and the address A is stored in an address memory as the search staring point (hereinafter referred to a pointer).

Then, when a new word is registered by depressing the registration key 7 in the second dictionary memory 13, the CPU 11 stores the word in the region from an address Y to an address Z depending on the number of letters. The pointer is changed to the address Y so that the next search is circularly executed from the address Y to the address A via the address Z and terminated at the address Y.

Judging that a coincident word data to an input word exists in the region from an address J to an address K in the second dictionary memory 13, the CPU 11 moves the word data to the region from the address Y to the address Z which is at the end of the blank region. The pointer is changed to the address Y so that other word data in the region from an address L to an address P is shifted to occupy the blank region from the address J to the address K. The next search is to be circularly executed from the address Y to the address A via the address Z and terminated at the address Y. A work memory 14 connected to the CPU 11 is made of the Random Access Memory (RAM) for storing an input word by the character keys 3 and the space key 4 via the CPU 11. The CPU 11 judges whether or not the input word data by the character keys 3 and the space key 4 to exists in the first and the second dictionary memories of 12 and 13. In case of the absence of the word data, the word is flickered on the CRT 9 to inform the operator of the spell-check result. Then, operation of the above constituted word processor is explained in reference to FIGS. 4–6.

When the CPU 11 is ready for various key operations on the input board 2 (Step 1, Step 2), letters, characters or numerals are input by the character keys 3 to be displayed one by one on the CRT 9 by the CPU 11 (Step 3). After a desired word is input by the character keys 3, the space key 4 is depressed to make a space between the word and the subsequent one (step 4), which allows CPU 11 to store the desired word in the work memory 14 by recognizing the queue of the letters as one word (step 5). Each word data stored in the first dictionary memory 12 is read one by one (step 6). By comparing the input word with each one stored in the first dictionary memory 12, the CPU 11 judges whether or not the word exists in the first dictionary memory 12 (step 7). When the coincident word data with the input word is judged to exist in the first dictionary memory 12 without misspelling, it is normally displayed on the CRT 9 by the CPU 11 (step 8). Then, the CPU 11 is ready for the next key operation (step 1, step 2).

When the coincident word data is judged not to exist in the first dictionary memory 12 (step 7), each data stored in the second dictionary memory 13 is read one by one (step 9) to be compared with the input word (step 10). After judging the coincident word data not to exist in the second dictionary memory 13, the CPU 11 flickers the word on the CRT 9 (step 11) to be ready for the next key operation (step 1, step 2).

Figure 5:
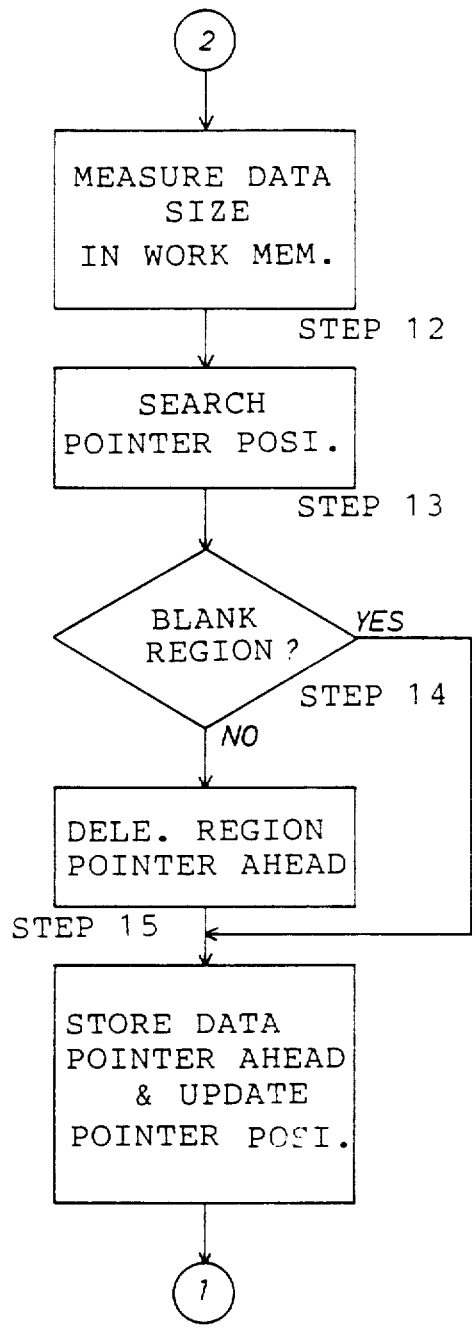
Figure 6:
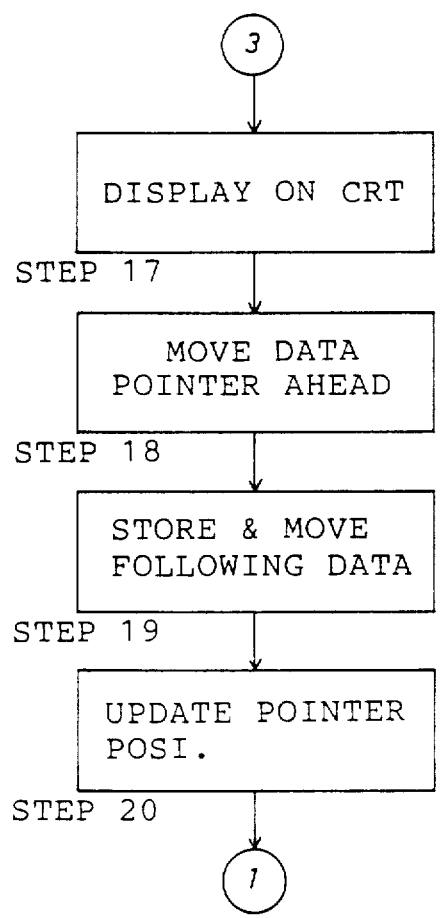

To register the flickered word in the second dictionary memory 13, the word is selected by the cursor key 6 to depress the registration key 7 and the select key 8 (step 1) succeedingly. Then, as shown in FIG. 5, the CPU 11 stores the word in the work memory 14, calculates the data size of the word corresponding to the number of letters (step 12), reads the address of the pointer from the address memory (step 13) and judges whether or not the blank region for registering the word exists in ahead of the pointer (step 14). Judging the existence of the blank region, CPU 11 stores the word in the region from the address Y to the address Z in ahead of the address A according to its data size, sets the pointer at the address Y (step 16), then proceeds to be ready for the next key operation. (step 1, step 2).

When a word is input by the character keys 3 and the space key 4 in the state that word data are stored in the region from the address A to the address P with the pointer set at the address A, after judging the coincident word with the input word not to exist in the first dictionary memory 12 (step 2–step 7) and to exist in the second dictionary memory 13 (step 9, step 10), the CPU 11 displays the word normally on the CRT 9.

Provided the coincident word data with the input word is stored in the region from the address J to K in the second dictionary memory 13, the CPU 11 moves the word data to the region from the address Y to the address Z in ahead of the pointer (step 18) and shifts the other word data stored in the region behind the address K, i.e. from the address L to the address P, to occupy the blank region from the address J to the address K (step 19). The CPU 11 then changes the pointer to the address Y (step 20) to be ready for the next key operation (step 1, step 2).

When the word data is increased to be full throughout the region of the second dictionary memory 13 by the aforementioned inputting and a word newly input by the operations of the character keys 3 and the space key 4 is judged to exist neither in the first nor the second dictionary memories 12 and 13 (step 1–step 10), the CPU 11 flickers the word on the CRT 9 (step 11). When the flickered word is selected with the cursor key 6 to depress the registration key 7 for registration in the second dictionary memory 13, the CPU 11 stores the word in the work memory 14, calculates its data size (step 12) and reads the present pointer address from the address memory (step 13) to judge whether or not the blank region for storing the input word exists in ahead of the pointer (step 14).

In the case of the absence of a blank region in ahead of the pointer with the address Q, the CPU 11 deletes a required number of data stored in the region from the address O to the address P in ahead of the address Q in order to store the input word (step 15). After storing the word in the region, the CPU 11 changes the pointer from the address Q to the address O (step 16) to be ready for the next key operation (step 1, step 2).

In the state that the new word is stored in the second dictionary memory 13, the next searching of the word data stored in the second dictionary memory 13 by the CPU 11 is started at the address O toward the address Z and executed circularly from the address Z to the address O via the address A.

As described above, this embodiment is so constructed that, when the coincident word data with an input word is judged to exist neither in the first nor the second dictionary memories 12 and 13, the word is registered in the second dictionary memory 13 by storing the word data in ahead of the pointer address in an address memory which is a search starting position. Then, the pointer is reset at the address in ahead of the newly stored data from which the next searching is circularly executed in the second dictionary memory 13.

When the coincident word data with an input word is judged to exist in the second dictionary memory, the word data is moved to the region ahead of the pointer. Then the pointer is reset at the address in ahead of the moved data from which the next searching is executed. The sequential word data to the pointer is shifted to occupy the blank region resulted from the word data movement. In registering a new word of the second dictionary memory 13, the word can be stored at the address with primary order of the next searching without moving pre-registered word data block.

Because the coincident word data with an input word of the second dictionary memory 13 can be moved to the address with primary order of the next searching and only a part of the pre-registered word data is needed to shift in the second dictionary memory, processing time is reduced compared with the conventional electronic dictionary which has to move all the word data.

The second embodiment of the present invention is to be described. The explanation is only related to the constitution and operation of the CPU 11 and the second dictionary memory 13, because the other part is the same as that of the first embodiment. The second dictionary memory 13 connected to the CPU 11 is made of a Random Access Memory (RAM) in which a word data registered through the registration key 7 is stored so that the latest registered word is addressed with primary order of the word searching by the CPU 11.

When the coincident word data with an input word by the operator is judged to exist in the second dictionary memory 13 by the CPU 11, the word data is moved to the address of the primary order of the searching by the CPU 11 in the second dictionary memory 13.

Figure 7:
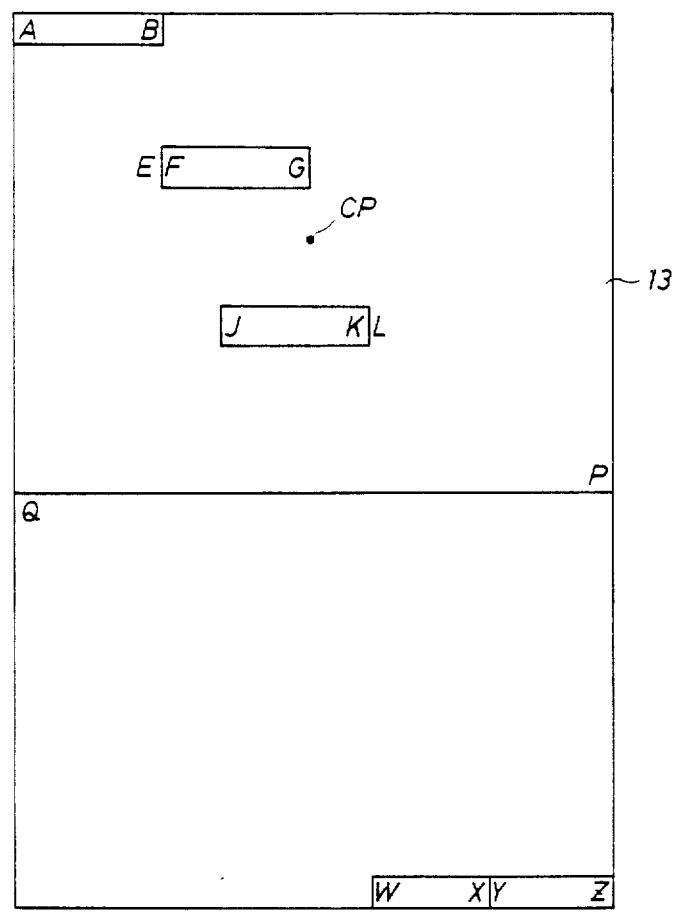
FIG. 7 is a descriptive view of the inside of the second dictionary memory in the second embodiment of the present invention.

Referring now to an example of the constitution on the basis of FIG. 7, the second dictionary memory 13 has a region from the address A to the address Z. In the region from the address A to the address P, plural word data are previously stored. The region from the address Q to the address Z is a blank region in which no word data are stored. The address A is stored in the address memory and the CPU 11 executes a word searching in direction from the address A to the address Z. For registration of a new word in the second dictionary memory 13 through the registration key 7, the CPU 11 stores the word in the region from the address Y to Z at the end of the blank region according to the number of letters and changes the pointer to the address Y so that the word searching is circularly executed from the address Y to the address A via the address Z and return to the address Y.

Judging the existence of the coincident word data with the input word in the second dictionary memory, the CPU 11 calculates a midpoint CP (a boundary between the word data which are the nearest to the exact midpoint) of the region from the address A to the address P where word data are stored to judge whether the coincident word data exists in back or ahead of the CP. For example, when the data exists in the region from the address F to the address G in back of the CP, the sequential data block in back of the address F is shifted forward to occupy the blank region from the address F to the address G, and the word data coincident to the input word is stored in back of the shifted data block in a region from the address A to the address B, so that the next search is executed from the address A to the address Z.

When the coincident word data exists in the region from the address J to the address K which are ahead of the CP, the data is moved to the region from the address Y to the address Z at the rear end of the blank region according to the number of letters of the word, and the word data stored in the region from the address L to the address P is shifted to occupy the blank region from the address J to the address K, so that the next search is circularly executed from the address Y to the address A via the address Z and terminated at the address Y.

Figure 4A:
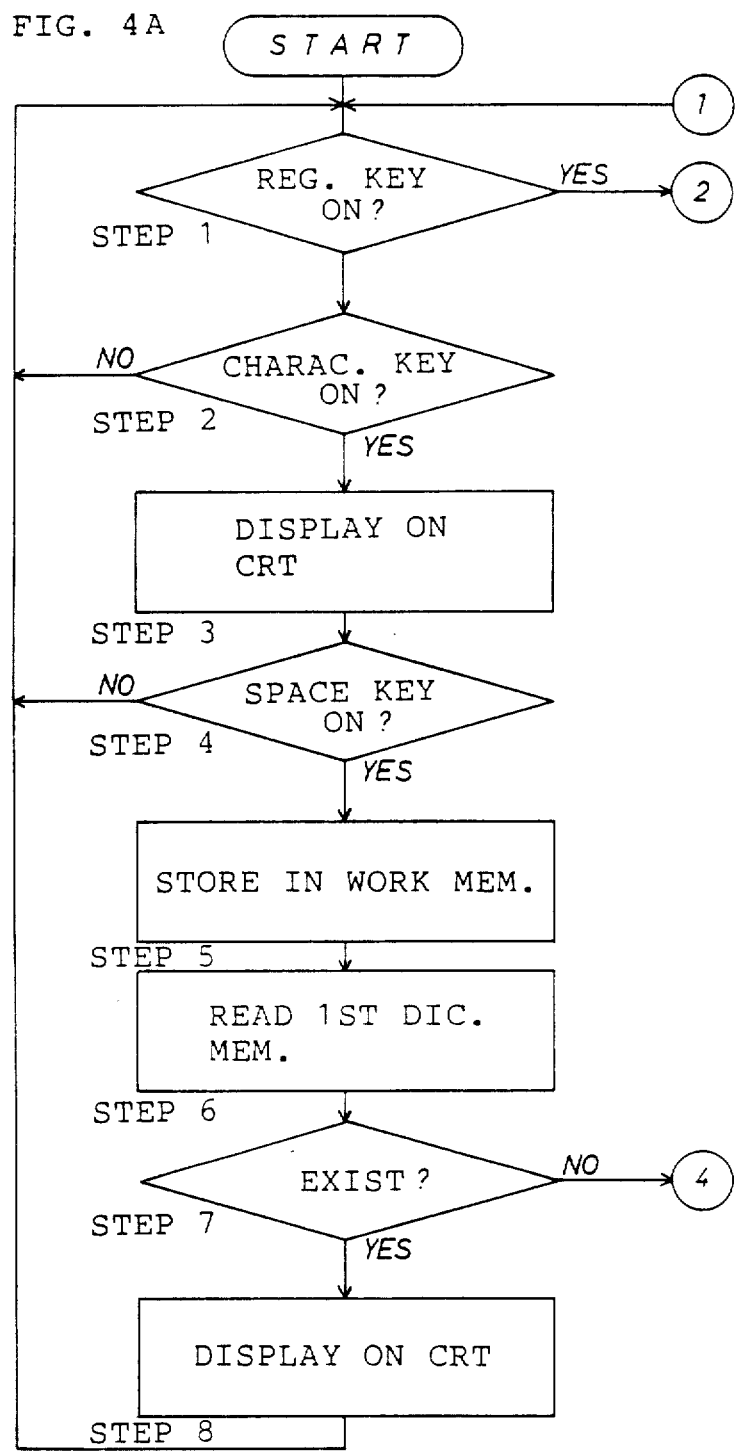
FIGS. 4A, 4B, 5 and 6 illustrate flowcharts showing the first embodiment.
Figure 4B:
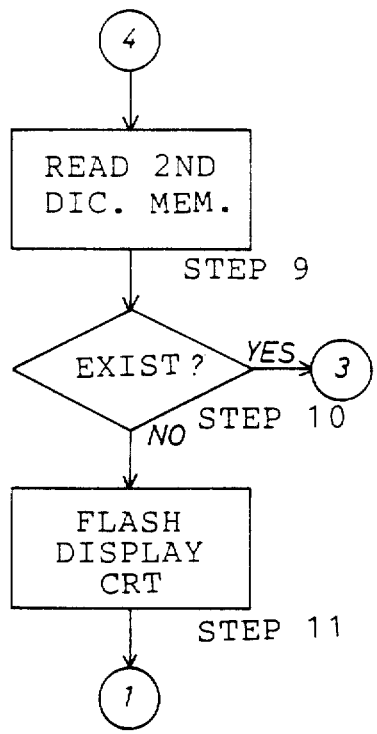
Figure 8:
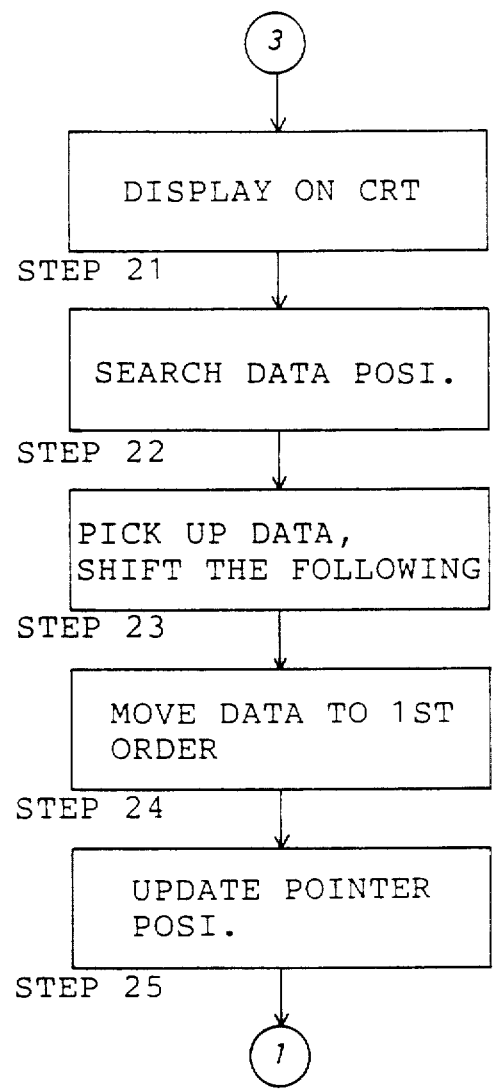
FIG. 8 is a flowchart of the second embodiment.

The operation of above constituted embodiment is to be described based on FIGS. 4, 7 and 8.

Since the case of operation in which the coincident word data is judged to exist in the first dictionary memory 12 and the case it is judged to exist neither in the first nor the second dictionary memories 12 and 13 are the same as the first embodiment mentioned above, the explanation can be omitted.

Judging a coincident word data with an input word through the character keys 3 and the space key 4 not to exist in the first dictionary memory 12 (step 1–step 7) but existing in the second dictionary memory 13 (step 9, step 10), the CPU 11 normally displays the word on the CRT 9 (step 21) as shown in FIG. 8. Then, the CPU 11 judges whether the coincident data with the word exists in back or ahead of the midpoint CP in the second dictionary memory 13 (step 22).

When plural word data are stored in the region from the address A to the address P with the pointer at the address A as shown in FIG. 7, the CPU 11 sets the midpoint CP to the center between the address A and the address P.

In case the word data is stored in the region from the address J to the address K, it is judged to exist in ahead of the midpoint CP.

Then, the CPU 11 moves the word data from the address J to the address K to the rear end, from the address Y to the address Z, of the blank region (step 23). The sequential data block stored in the region from the address L to the address P is moved to occupy the blank region from the address J to the address K (step 24). The pointer is changed to the address Y (step 25). The CPU 11 is ready for the next key operation (step 1, step 2). When the word data is shifted in the second dictionary memory 13, the next searching is circularly executed from the address Y which is set in the address memory to the address A via the address Z and terminated at the address Y. Judging a coincident word data with an input word to exist back of the midpoint CP, for example, in the region with the address from F to the address G, the CPU 11 picks up the word data and moves the sequential data block stored in the region from the address A to the address E backward to occupy the blank region from the address F to the address G (step 23). Storing the picked data to the region from the address A to the address B, (step 24) the CPU 11 changes the pointer to the address A (step 25).

Judging a coincident word data with an input word to exist in back of the midpoint CP of the second dictionary memory 13, the CPU 11 stores the word data in the region with the address W to X in ahead of the address Y and sets the pointer at the address W so that the next searching is circularly executed from the address W to the address A via the address Z and terminated at the address W.

The aforementioned system is so constructed that it can save processing time compared with the conventional electronic dictionary in which it is required to move all the stored data in order to move a newly registered word or the coincident word data with an input word to the primary searching position in the second dictionary memory 13.

What is claimed is:

1. An apparatus for checking a spelling of an input English word comprising:
    an input device for receiving a word;
    an electronic dictionary memory including a first dictionary in which pre-installed English words are stored and a second dictionary, said first and second dictionaries having a plurality of locations identified by addresses and second dictionary storing English words which are not stored in the first dictionary;
    an address memory in which an address of the second dictionary is stored, the address being arranged such that start and end locations of the second dictionary are adjacent and consecutive with one another;
    a search means for searching an input word through the first and the second dictionary, the search means searching in the second dictionary circularly from said start location whose address is stored in the address memory to said adjacent end location; and
    a store means for storing a new input word that has been found in neither the first nor the second dictionary into the second dictionary, including (a) a writing means for writing the new input word at a location just before the start location in the second dictionary whose address is stored in the address memory, and (b) a change means for changing the start address in the address memory to a start address of the location in the second dictionary at which the new input word is stored, whereby a new word is added before the previous start address of the search means such that the search means begins searching at the location of the new input word.

2. The apparatus of claim 1 wherein the English words in the second dictionary are stored collectively in a block and the address in the address memory indicates the address of the block.

3. The apparatus of claim 2 wherein the apparatus further comprises a display means for displaying a plurality of input words and for indicating whether the input words are spelled correctly.

4. An apparatus for checking a spelling of an input English word comprising:
    an input device for receiving a word;
    an electronic dictionary memory including a first dictionary in which pre-installed English words are stored and a second dictionary, said first and second dictionaries each having a plurality of locations identified by addresses and said second dictionary storing English words which are not stored in the first dictionary;
    an address memory in which an address of the second dictionary is stored, the address being arranged such that start and end locations of the second dictionary are adjacent and consecutive with one another;
    a search means for searching an input word through the first and the second dictionary, the search means searching in the second dictionary circularly from a start location whose address is stored in the address memory adjacent to said end location; and
    a rearrangement means for rearranging the second dictionary if an input word is found in the second dictionary, including (a) a move means for moving the found input word to a location just before the start location whose address is stored in the address memory, and (b) a change means for changing the start address of the search means in the address memory to a start address of the location in the second dictionary at which the moved word is stored, whereby a moved word is added before the previous start address of the search means such that the search means begins searching at the location of the moved word.

5. The apparatus of claim 4 wherein the English words in the second dictionary are stored collectively in a block and the address in the address memory indicates the address of the block.

6. The apparatus of claim 5 wherein the apparatus further comprises a display means for displaying a plurality of input words and for indicating whether the input words are spelled correctly.

7. A method for checking a spelling of an input English word, in relation to an electronic dictionary system including an input device, an electronic dictionary memory consisting essentially of a first dictionary in which pre-installed English words are stored and a second dictionary for storing English words which are not stored in the first dictionary, each of said first and second dictionaries having a plurality of locations identified by addresses, an address memory in which an address of the second dictionary is stored and a control circuit, comprising steps of:
    (a) receiving an input word from the input device;
    (b) searching the input word in the first dictionary with the control circuit;
    (c) searching in the second dictionary circularly from a start location whose address is stored in the address memory to an end location just before the start location whose address is stored in the address memory with the control circuit when the input word is not found in the first dictionary;
    (d) writing the input word, when the input word has been found in neither the first nor the second dictionary, into the second dictionary at a location just before the start location whose address is stored in the address memory; and
    (e) changing the start address of the search means in the address memory to a new start address of the location at which the word is written in step (c), whereby inputted words are located before the previous start address of the search means such that the search means begins searching at the location of the inputted word.

8. An apparatus for checking a spelling of an input English word comprising:

an input device for receiving a word;

an electronic dictionary memory including a first dictionary in which pre-installed English words are stored and a second dictionary, said first and second dictionaries each having a plurality of locations identified by addresses and said second dictionary storing English words which are not stored in the first dictionary;

an address memory in which an address of the second dictionary is stored, the address being arranged such that start and end locations of the second dictionary are adjacent and consecutive with one another, and the English words in the second dictionary being stored collectively in a block and the address in the address memory indicates the address of the block;

a search means for searching an input word through the first and the second dictionary, the search means searching in the second dictionary circularly from a start location whose address is stored in the address memory adjacent to said end location; and a rearrangement means for rearranging the second dictionary if an input word is found in the second dictionary, including (a) a move means for moving the found input word to a location just before the start location in the second dictionary whose address is stored in the address memory if the found input word has been stored at a location whose address is after a midpoint of the block, and for moving the found input word to a location just after the start location in the second dictionary whose address is stored in the address memory if the found input word has been stored at a location whose address is before the midpoint of the block; and (b) a change means for changing the start address of the search means in the address memory to a start address of the location in the second dictionary at which the moved word is stored, whereby a moved word is added before or after the previous start address of the search means such that the search means begins searching at the location of the moved word.

* * * * *